Feb. 20, 1934.　　　　H. M. JACOBS　　　　1,948,351
ELECTRICAL POWER EQUIPMENT
Filed July 30, 1931
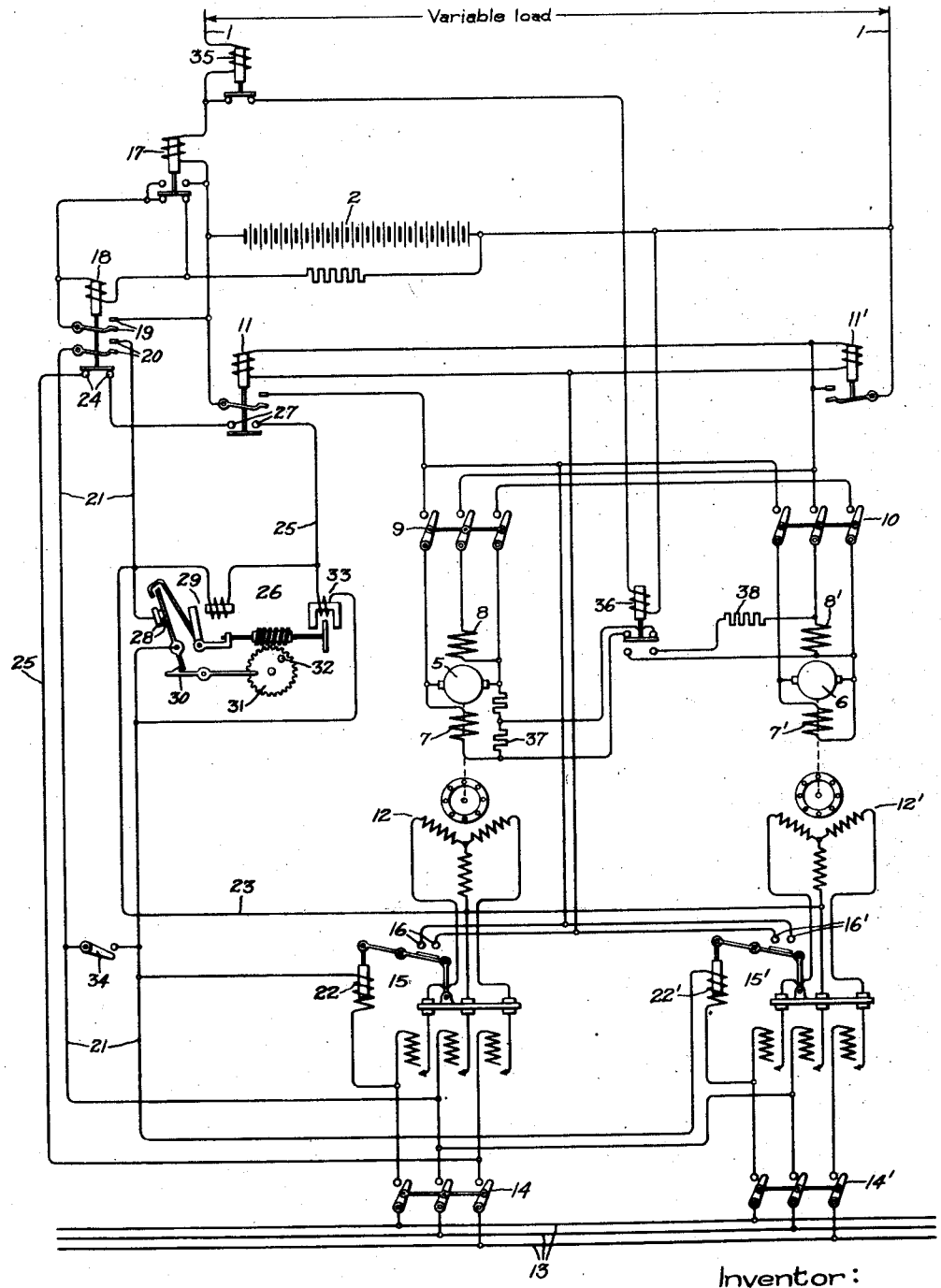
Inventor:
Harry M. Jacobs,
by Charles E. Fuller
His Attorney.

Patented Feb. 20, 1934

1,948,351

UNITED STATES PATENT OFFICE 1,948,351

ELECTRICAL POWER EQUIPMENT

Harry M. Jacobs, Scotia, N. Y., assignor to General Electric Company, a corporation of New York Application July 30, 1931. Serial No. 554,053

8 Claims. (Cl. 171—314)

My invention relates to electrical power equipments and more particularly to such equipments for supplying power to a direct current load circuit which is subject to widely varying loads.

Many industrial load circuits have such a wide difference between the average load applied thereto and relatively infrequent peak loads applied thereto that it is uneconomical to provide a generator, or other source of current supply, for such circuits having a rating capable of supplying the peak loads. An example of such a load circuit is a circuit for supplying power to a railroad classification yard. Such yards are provided with power operated switches, signals, track circuits and car retarders. The car retarders are electromagnetically operated braking means for controlling the speed and stopping position of cars which have been humped over a rise in the classification yard. By the use of these retarders the cars are controlled in a manner to permit their classification and switching and their final make-up into trains. Such retarders draw a relatively heavy current having a usual inrush value of not less than about 45 amperes. As the humping operations in classification yards vary from day to day and week to week, it is obvious that the load on the power equipment for supplying such a yard will also vary widely from day to day and from week to week.

In accordance with my invention I provide a combined storage battery and generator for supplying power to such a load circuit and a special control arrangement for the battery and generator. This control arrangement operates in such a manner that during light loads only the battery supplies power to the circuit, while during intermediate loads up to about the average load on the circuit the generator is connected to supply substantially all of the load, while during peak loads above the average load, the load is again shifted to the battery. I also provide automatic time delay means for insuring a charge of the battery for a predetermined time during light load conditions on the circuit.

It is an object of my invention to provide a new an improved electrical power equipment.

It is another object of my invention to provide a simple and economical arrangement for supplying power to a direct current load circuit which is subjected to widely varying loads.

My invention will be better understood from the following description taken in connection with the accompanying drawing and its scope will be pointed out in the appended claims.

Referring now to the single figure of the accompanying drawing, wherein I have illustrated diagrammatically an example of an operative embodiment of my invention, 1 is a variable load circuit to which is connected a storage battery 2. A generator for supplying the normal load of circuit 1 is shown at 5, while a duplicate generator 6 is arranged to be capable of substitution for generator 5 when desired. My invention is not limited to the use of duplicate generators but it is preferable to employ two such machines so that one may be used as a stand-by source in case the other fails and also to provide extra rapid charging of the batteries when this becomes necessary. Generators 5 and 6 are preferably compound wound machines having shunt field windings 7 and 7' respectively and series field windings 8 and 8' respectively. Suitable switches or circuit controlling means 9 and 10 are provided for allowing the selective connection of machines 5 and 6 and load circuit 1. These switches may also be employed to parallel the generators at times when it is desired to charge the battery at an extra rapid rate.

The connection of generator 5, or 6, to load circuit 1 is controlled by a pair of single pole electro-responsive switches 11 and 11', although it will be obvious to those skilled in the art that a unitary double pole switch might be substituted for the two single pole switches without departing from my invention in its broader aspects.

Generators 5 and 6 may be driven by any suitable source of power supply and as shown they form elements of motor generator sets which have three-phase alternating current motors 12 and 12' respectively. These motors are energized from a suitable source of power supply, such as a three-phase supply circuit 13, through switches 14 and 14'. They are controlled by means of motor starters of any type, such as those which have been diagrammatically illustrated at 15 and 15'. The starters 15 and 15' are provided with sets of parallel connected contacts 16 and 16' which are in an energizing circuit for switches 11 and 11'. This circuit is energized from generator 5 or generator 6.

The control circuits for this power equipment include a master load responsive relay 17. This relay is arranged to pick up at approximately 20 amperes, for example, and to drop out at a lower value, such, for example, as about 10 amperes. Under the control of master load responsive relay 17 is another relay 18. This relay has its operating coil energized from across the battery 2 and its circuit is completed when relay 17 picks up. A pair of contacts 19 on relay 18 close when this relay picks up and thereby seal in the operating coil of relay 18. The purpose of this arrangement is to prevent chattering and intermittent operation of relay 18 if the load should fluctuate rapidly about the pick-up value of relay 17. A second pair of contacts 20 on relay 18 are arranged to close a control circuit 21 when this relay picks up. This control circuit is energized from any suitable source of current supply, such as from one of the phases of power supply circuit 13, for example. Connected in parallel with each other in control circuit 21 are operating windings 22 and 22' of motor starters 15 and 15', respectively. Consequently, when contacts 20 close, starter 15 or 15' will be actuated, thereby to bring its associated motor up to speed, depending upon whether switch 14 or 14' is closed respectively. As soon as starter 15 or 15' is actuated to complete the energizing circuit for its associated motor, contacts 20 of relay 18 will be short circuited by a conductor 23 whose circuit is completed through the center contacts of the starter which is actuated. Consequently contacts 20 lose control as soon as either one of the starters is actuated. A third pair of contacts 24 are arranged to be opened when relay 18 picks up and these contacts are connected in a circuit 25 for energizing a time delay relay 26. Also connected in the circuit for energizing this time delay relay are a pair of contacts 27 on switch 11. Relay 26 has a pair of contacts 28 which are normally closed and which are connected to control the deenergization of magnet 22, or 22', of starter 15, or 15'. As shown they are connected in circuit 21 so as to be able to break either the circuit completed through contacts 20 or the sealing-in circuit through the starter and conductor 23.

Time delay relay 26 is of the type whose contacts are normally closed and which, when it is energized, opens its contacts after a predetermined time and then automatically closes them again as soon as it is deenergized. The relay which is illustrated is merely one of a number of equivalent relays of this type. Its details are disclosed and its features are claimed in United States Patent 1,699,125, granted on January 15, 1929, upon an application of Hugh M. Stephenson. In addition to its contacts 28, the essential elements of this relay are an electromagnetically actuated assembly 29 for urging contacts 28 open, a latch 30 for opposing the action of 29, a tripping element for 30 in the form of a gear wheel 31 having a tripping pin 32, and an electric motor 33.

Briefly described, the operation of this relay is as follows. With conductor 25 connected to one of the phase conductors of the supply circuit through contacts 24 and 27, the electromagnetic means 29 will have its energizing circuit completed directly through conductors 25 and 23 while motor 34 will have its energizing circuit completed through conductor 25, contacts 28 and conductor 23. When 29 is energized it acts to simultaneously urge contacts 28 open and to connect gear 31 mechanically to motor 33. Latch 30 holds contacts 28 closed until the time required for motor 33 to turn wheel 31 enough for pin 32 to trip latch 30. The contacts 28 then open, thereby breaking the motor circuit. When 29 is deenergized again, by the opening of contacts 27, for example, the parts return to the positions shown in the drawing. The resetting of gear 31 and pin 32 is accomplished by a suitable return spring (not shown). It should be noted that with this arrangement the relay 26 will automatically return to its original position if it should be energized for a time which is less than its time setting and then be deenergized again.

When relay 17 drops out, it is arranged to short circuit the operating winding of relay 18, thereby causing the deenergization, and the restoration to its normal position, of relay 18.

It is sometimes desirable to provide manual control of the generator, or generators, for charging the battery 2 and consequently I provide a manually controlled switch 34 connected across circuit 21. Closure of this switch controls the starters independently of contacts 24, 27 and 28.

Generators 5 and 6 are designed to have a substantially flat voltage characteristic so that with variations in load on the system these generators will carry approximately all of the load while they are in operation. As it would be difficult and expensive to design these generators so as to have a substantially flat voltage characteristic up to a certain load value and then have a drooping characteristic beyond that value so as to prevent overloading of these machines, I provide automatic means operated on load demand for reducing the voltage of these machines and consequently for shifting the load to the battery during peak load conditions which would otherwise tend to overload the generators. This means is illustrated, by way of example, as a load demand operated relay 35, which is arranged to control the operation of a second relay 36. The arrangement is such that when the load on circuit 1 exceeds a certain value, such for example as approximately 75 amperes, relay 35 picks up thereby deenergizing the relay 36. Relay 36 controls means for varying or, rather, automatically decreasing the excitations of the generators. Thus, for example, it has a pair of normally closed upper contacts which are arranged to short circuit a resistance 37 in the circuit of shunt field winding 7 of generator 5. Thus, when relay 36 is deenergized this resistance 37 is inserted in the shunt field winding circuit thereby decreasing the voltage of generator 5. As an alternative arrangement, relay 36 is provided with a pair of normally open contacts which, when closed by the deenergization of relay 36, are arranged to shunt series winding 8' of generator 6 with a relatively low resistance 38, thereby also decreasing the excitation of generator 6.

The operation of the illustrated embodiment of my invention is as follows. As the operation of the two motor generator sets and their starting means are identical, with the exception of the operation of the means for reducing the voltage of the generators, which has already been described, the operation of the system with only generator 5 operating will be considered. Thus, assume that switches 10, 14' and 34 are open, and that switches 9 and 14 are closed. Assume also that supply circuit 13 is energized and that there is no load on load circuit 1. Under these conditions the remaining elements will be in the positions shown in the drawing. If now small loads are added to circuit 1 they will be supplied with power from battery 2. However, as soon as the total load reaches the pick-up value of relay 17, this relay, and consequently relay 18, will be actuated. The closing of contacts 20 completes the operating circuit for operating means 22 of starter 15. Consequently, motor 12 is brought up to speed by the operation of starter 15 and when starter 15 has completed its operation contacts 16 will be bridged. This connects relays 11 and 11' across generator 5 and these relays are so arranged that they do not pick up until the generator voltage is substantially normal. As soon as this voltage is attained relays 11 and 11' close and generator 5 is connected to circuit 1 in parallel with battery 2. This state of affairs continues until extra heavy loads are applied to circuit 1, such for example, as the simultaneous operation of three or four car retarders. When the load exceeds the pick-up value of relay 35, this relay will cause the deenergization of relay 36 thereby inserting resistance 37 in series with shunt field winding 7 of generator 5 and consequently reducing its voltage. In this manner the peak loads are automatically shifted from the generator 5 to the battery 2.

When the load on circuit 1 falls, relay 35 may be arranged to drop out at substantially the same value at which it picks up or at some other value depending upon this relay's design and drop-out characteristics. With the restoration of relays 35 and 36, the generator voltage is returned to approximately the value it had before an excessive overload was applied. When the load falls to the drop-out value of relay 17 the operating winding of relay 18 will be short circuited and this relay will drop out thereby closing its contacts 24. As contacts 27 of relay 11 are already closed the closure of contacts 24 completes the operating circuit of time delay relay 26. This immediately starts the operation of this relay. During the time of operation of relay 26 the battery is therefore being charged by the generator 5. After a predetermined time, depending on the setting of relay 24, the contacts of this relay will open, thereby breaking the circuit for operating means 22 of starter 15. This causes starter 15 to return to the position shown in the drawing thereby breaking contacts 16 with the result that relays 11 and 11' are deenergized. As soon as relay 11 is deenergized contacts 27 are broken and the time delay relay 26 will be deenergized, thus resetting the relay for another operation.

By closing switches 10 and 14' and opening switches 9 and 14 the same operation will take place with generator 6 and motor 12'. It may also at times be desirable to operate both of these motor generator sets simultaneously when of course, all four switches will be closed.

It will thus be seen that, with the above described arrangement, a practically standard designed generator may be arranged to supply power to a very variable load circuit having peak loads which are greatly in excess of the generator rating.

While I have shown and described a particular embodiment of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, a variable load circuit, a storage battery connected to said circuit, a generator, means for connecting said generator to said circuit when the load thereon exceeds a predetermined value, and means for reducing the voltage of said generator when the load on said circuit exceeds a second predetermined value which is higher than the first whereby said storage battery shall be operative to supply said excess load.

2. In combination, a variable load circuit, a storage battery connected thereto, a power supply circuit, a motor-generator set for transmitting power between said supply circuit and said load circuit, means operative in accordance with a predetermined load on said load circuit for starting said motor-generator set, and means for reducing the voltage of the generator of said set when the load on said load circuit exceeds by a predetermined amount the value at which said set was started whereby said storage battery shall be operative to supply said excess load.

3. In combination, a variable load circuit, a storage battery connected thereto, a power supply circuit, a motor-generator set for transmitting power from said supply circuit to said load circuit, means operative in response to a predetermined load on said load circuit for successively starting said motor-generator set and connecting the generator thereof to said load circuit, and means for reducing the voltage of said generator when the load on said load circuit exceeds by a predetermined amount said predetermined load whereby said storage battery shall be operative to supply said excess load.

4. In combination, a variable load circuit, a storage battery connected to said circuit, a generator having a rating substantially equal to the average load on said circuit, means for connecting said generator to said load circuit when the load on said circuit exceeds a predetermined value which is intermediate no load and its average load, said generator having a voltage which is higher than the voltage of said battery, and means for reducing the excitation of said generator when the load on said circuit exceeds the rating of said generator whereby the load is shifted to the battery.

5. In combination, a variable load circuit, a storage battery connected thereto, a motor-generator set, a starter for the motor thereof, means jointly controlled by the starter and the generator voltage for connecting the generator to said circuit, relay means for operating said starter in response to a predetermined load on said circuit, and time delay means for continuing the operation of said set a predetermined time after the load on said circuit falls a predetermined amount below the predetermined value at which said starter is operated whereby said generator shall be operative to charge said battery during the time delay interval of said time delay means.

6. In combination, a variable load circuit, a storage battery connected thereto, a generator, a switch for connecting said generator to said circuit, said switch having a separate pair of contacts which are closed when said switch is closed, a circuit for controlling the operation of said switch, relay means responsive to the load on said load circuit for completing said control circuit, a pair of separate contacts on said relay means which are open when said relay is closed, a time delay relay connected to maintain said control circuit completed for a predetermined time after it is energized, and an energizing circuit for said time delay relay which includes both said pairs of separate contacts in series.

7. In combination, a variable load circuit, a storage battery connected thereto, a generator, means for connecting said generator to said circuit when the load thereon exceeds a predetermined value, means for reducing the voltage of said generator when the load on said circuit reaches a predetermined value which is higher than said first mentioned predetermined value, and means having a time delayed action for disconnecting said generator from said circuit a predetermined time after the load on said circuit becomes less than said first mentioned load value.

8. In combination, a variable load circuit, a storage battery connected to said circuit, a power supply circuit, a motor generator set for transmitting power from said supply circuit to said load circuit, a starter for the motor of said set, relay means for causing said starter to start said motor when the load on said load circuit exceeds a predetermined value and to stop said motor when said load falls a predetermined amount below said starting value, a time delay arrangement for causing a time delayed stopping of said motor, and means for reducing the excitation of the generator of said set when the load on said circuit exceeds the value at which said motor is started by a predetermined amount.

HARRY M. JACOBS.